(12) United States Patent
McAteer et al.

(10) Patent No.: US 11,030,416 B2
(45) Date of Patent: **\*Jun. 8, 2021**

(54) LATENT AMBIGUITY HANDLING IN NATURAL LANGUAGE PROCESSING

(71) Applicant: International Business Machines Corporation, Armonk, NY (US)

(72) Inventors: Seamus R. McAteer, Navan (IE); Daniel J. McCloskey, Dublin (IE); Mikhail Sogrin, Kildalkey (IE)

(73) Assignee: International Business Machines Corporation, Armonk, NY (US)

( \* ) Notice: Subject to any disclaimer, the term of this patent is extended or adjusted under 35 U.S.C. 154(b) by 174 days.

This patent is subject to a terminal disclaimer.

(21) Appl. No.: 16/440,073

(22) Filed: Jun. 13, 2019

(65) Prior Publication Data

US 2019/0294682 A1    Sep. 26, 2019

Related U.S. Application Data

(63) Continuation of application No. 15/189,494, filed on Jun. 22, 2016, now Pat. No. 10,331,788.

(51) Int. Cl.
| | |
|---|---|
| *G06F 17/27* | (2006.01) |
| *G06F 17/24* | (2006.01) |
| *G06F 40/30* | (2020.01) |
| *G06F 40/169* | (2020.01) |
| *G06F 40/279* | (2020.01) |
| *G06F 40/35* | (2020.01) |

(52) U.S. Cl.
CPC ............ *G06F 40/30* (2020.01); *G06F 40/169* (2020.01); *G06F 40/279* (2020.01); *G06F 40/35* (2020.01)

(58) Field of Classification Search
CPC .... G06F 17/27; G06F 17/2785; G06F 17/279; G06F 17/2765
USPC ........................................................ 704/1, 9
See application file for complete search history.

(56) References Cited

U.S. PATENT DOCUMENTS

| | | | |
|---|---|---|---|
| 6,721,697 | B1 | 4/2004 | Duan et al. |
| 7,809,548 | B2 | 10/2010 | Mihalcea et al. |
| 7,953,754 | B2 | 5/2011 | Cunnane et al. |
| 8,122,016 | B1 | 2/2012 | Lamba et al. |

(Continued)

OTHER PUBLICATIONS

"List of IBM Patents or Patent Applications Treated as Related", Jun. 13, 2019, 2 Pages.

(Continued)

*Primary Examiner* — Pierre Louis Desir
*Assistant Examiner* — Mark R Hennings
(74) *Attorney, Agent, or Firm* — Stephen R. Tkacs; Stephen J. Walder, Jr.; Ingrid M. Foerster

(57) ABSTRACT

Mechanisms are provided for latent ambiguity handling in natural language processing. The method may include: providing an annotated semantic graph based on a knowledge base in which nodes representing semantic concepts are linked by semantic relationships, wherein one or more nodes are annotated to indicate a latent ambiguity of the semantic concept; processing a natural language input by activation of the annotated semantic graph; during processing when encountering an annotated node indicating a latent ambiguity of the semantic concept, applying a pre-defined latent ambiguity process to the node; and replacing any annotated nodes indicating a latent ambiguity of the concept remaining in an output of the processing of the natural language input with an alternative node from the semantic graph.

25 Claims, 12 Drawing Sheets

(56) References Cited

U.S. PATENT DOCUMENTS

| | | | |
|---|---|---|---|
| 8,463,593 | B2 | 6/2013 | Pell et al. |
| 8,712,758 | B2 | 4/2014 | Crouch et al. |
| 8,768,969 | B2 | 7/2014 | Huerta et al. |
| 2007/0118357 | A1 | 5/2007 | Kasravi et al. |
| 2008/0005094 | A1 | 1/2008 | Cunnane et al. |
| 2008/0263038 | A1 | 10/2008 | Judge et al. |
| 2009/0024385 | A1 | 1/2009 | Hirsch |
| 2010/0076972 | A1 | 3/2010 | Baron et al. |
| 2010/0161316 | A1 | 6/2010 | Haug |
| 2013/0103389 | A1 | 4/2013 | Gattani et al. |
| 2013/0197900 | A1 | 8/2013 | Rotbart et al. |
| 2015/0057991 | A1 | 2/2015 | Mesheryakov et al. |
| 2015/0142704 | A1 | 5/2015 | London |
| 2015/0269139 | A1 | 9/2015 | McAteer et al. |
| 2016/0203130 | A1 | 7/2016 | Roque et al. |
| 2017/0024461 | A1 | 1/2017 | Mac an tSaoir |
| 2017/0060912 | A1 | 3/2017 | Liu et al. |

OTHER PUBLICATIONS

"Ambiguity (law)", Wikipedia, https://en.wikipedia.org/wiki/Ambiguity_(law), accessed on Jun. 22, 2016, 2 pages.

Charbel, Nathalie et al., "Resolving XML Semantic Ambiguity", OpenProceedings,org, Proceedings of the 18th International Conference on Extending Database Technology (EDBT), Brussels, Belgium, Mar. 23-27, 2015, pp. 277-288.

"Deixis", Wikipedia, https://en.wikipedia.org/wiki/Deixis, accessed on May 9, 2016, 9 pages.

Duan, Huizhong, "Intent Modeling and Automatic Query Reformulation for Search Engine Systems", University of Illinois at Urbana-Champaign, Doctor of Philosophy in Computer Science, Dissertation, 2013, 131 pages.

Fouss, Francois et al., "Random-walk computation of similarities between nodes of a graph, with application to collaborative recommendation", IEEE Transactions on knowledge and data engineering 19.3, May 16, 2006, 31 pages.

Hangyo, Masatsugu et al., "Japanese Zero Reference Resolution Considering Exophora and Author/Reader Mentions", Proceedings of the 2013 Conference on Empirical Methods in Natural Language Processing, http://anthology.aclweb.org/D/D13/D13-1095.pdf, Oct. 18-21, 2013, pp. 924-934.

Hessami, Ehsan et al., "Unsupervised Graph-based Word Sense Disambiguation Using lexical relation of WordNet", IJCSI International Journal of Computer Science Issues, vol. 8, Issue 6, No. 3, Nov. 2011, pp. 225-230.

Lee, Heejung et al., "Ontological semantic inference based on cognitive map", Expert Systems with Applications, vol. 41, Issue 6, May 2014, pp. 2981-2988.

Li, Fei et al., "NaLIR: An Interactive Natural Language Interface for Querying Relational Databases", ACM, Proceedings of the 2014 ACM SIGMOD international conference on Management of data, Snowbird, UT, Jun. 22-27, 2014, pp. 709-712.

Li, Xiaoguang, "Web Page Classification and Hierarchy Adaptation", Lehigh University, Lehigh Preserve, Theses and Dissertations, Paper 1386, Jan. 2012, 207 pages.

Lu, Zhimao et al., "A Vicarious Words Method for Word Sense Discrimination", Springer-Verlag Berlin Heidelberg, International Conference on Intelligent Computing (ICIC 2008), LNCS 5226, Sep. 2008, pp. 397-404.

Lu, Zhimao et al., "An Equivalent Pseudoword Solution to Chinese Word Sense Disambiguation", Association for Computational Linguistics, Proceedings of the 21st International Conference on Computational Linguistics and the 44th annual meeting of the Association for Computational Linguistics, Jul. 2006, 8 pages.

Mac An Tsaoir, Ronan, "Using Spreading Activation to Evaluate and Improve Ontologies", ACL, http://www.aclweb.org/anthology/C/C14/C14-1211.pdf, Proceedings of COLING 2014, the 25th International Conference on Computational Linguistics: Technical Papers, Dublin, Ireland, Aug. 23-29, 2014, pp. 2237-2248.

Mekonnen, Solomon, "Word Sense Disambiguation for Amharic Text: A Machine Learning Approach", Addis Ababa University, School of Graduate Studies, Unpublished Master's Thesis, Jun. 2010, 94 pages.

Navigli, Roberto et al., "A Graph-based Algorithm for Inducing Lexical Taxonomies from Scratch", IJCAI, vol. 2, No. 5.1, Jun. 2011, 6 pages.

Prager, John et al., "Answering What-is Questions by Virtual Annotation", Association for Computational Linguistics, Proceedings of the first international conference on Human language technology research (HLT '01), Stroudsburg, Pennsylvania, Mar. 2001, pp. 1-5.

Qi, Xiaoguang, "Web Page Classification and Hierarchy Adaptation", A Dissertation Presented to the Graduate and Research Committee of Lehigh University in Candidacy for the Degree of Doctor of Philosophy in Computer Science, Lehigh University, Jan. 2012, 221 Pages.

Rimell, Laura, "Distributional Lexical Entailment by Topic Coherence", Proceedings of the 14th Conference of the European Chapter of the Association for Computational Linguistics, Apr. 26-30, 2014, pp. 511-519.

Sinha, Ravi, "Unsupervised Graph-based Word Sense Disambiguation Using Measures of Word Semantic Similarity", IEEE, International Conference on Semantic Computing (ICSC 2007), Sep. 2007, 7 pages.

Speer, Robert et al., "ConceptNet 5: A Large Semantic Network for Relational Knowledge", Springer-Verlag Berlin Heidelberg, The People's Web Meets NLP, Theory and Applications of Natural Language Processing, Chapter 6, Feb. 2013, pp. 161-176.

Yupeng, J. et al., "LSA-based Chinese-Slavic Mongolian NER disambiguation", 2015 IEEE International Conference on Computer and Information Technology, Oct. 2015, pp. 703-707.

LATENT AMBIGUITY HANDLING IN NATURAL LANGUAGE PROCESSING

BACKGROUND

The present invention relates to latent ambiguity handling, and more specifically, to latent ambiguity handling in natural language processing.

Ambiguous language is a problem in natural language processing (NLP) systems. Words may be unambiguous at their face value, but may have different meanings, subtleties, or sub-groups that affect their meaning.

For example, if it is known that a document's content is referring to the topic of Education, it is known that the word "school" is more likely referring to the sense of an "educational institution" rather than the meaning of a "group of fish". This is where traditional word-sense disambiguation processes would stop, satisfied that the job is finished. However, a lot of ambiguity still remains. Is it a secondary or primary school, or is it even a school in Ireland? The word "school" is inherently ambiguous because it does not provide enough information. Perhaps the school in question is actually for training dogs rather than people.

The term "latent natural language ambiguity" is used herein to describe this phenomenon, borrowing from the legal definition of "latent ambiguity" where the wording of an instrument is on the face of it clear and intelligible, but may, at the same time, apply equally to two different things or subject matters. Latent natural language ambiguity is defined as instances where the sense of a word may appear to be clear and intelligible but at the same time, may apply equally to any number of alternative senses.

When referring to the meaning of "school" as an educational institution, the precise characteristics of that institution are not defined in this general sense. Only by anaphora resolution in the text, if a more fine-grained semantic meaning exists there, can the true contextual meaning of the word school be made apparent. However, such co-reference resolution techniques focus on the immediate context of documents, paragraphs, and sentences. What if the true meaning of "school" is something dependent on a larger context, such as in the query "Which school should I send my 10 year old daughter to?" The simple realization that a primary school is needed, or a school suitable for 10 year old girls, is extremely valuable information for any complex NLP system, such as a question answer or search system.

SUMMARY

According to a first aspect of the present invention there is provided a computer-implemented method for latent ambiguity handling in natural language processing, comprising: providing an annotated semantic graph based on a knowledge base in which nodes representing semantic concepts are linked by semantic relationships, wherein one or more nodes are annotated to indicate a latent ambiguity of the semantic concept; processing a natural language input by activation of the annotated semantic graph; and during processing when encountering an annotated node indicating a latent ambiguity of the semantic concept, applying a pre-defined latent ambiguity process to the node.

This provides the advantage that any NLP processes that leverage the annotated semantic graph will process latently ambiguous nodes with pre-defined processing methods.

The method may include replacing any annotated nodes indicating a latent ambiguity of the concept remaining in an output of the processing of the natural language input with an alternative node from the semantic graph. The method may include re-activating the annotated semantic graph using a latency ambiguity resolution method.

Providing an annotated semantic graph may include identifying a node having a latently ambiguous semantic concept by applying a trained statistical model for predicting the likelihood that a node is a latently ambiguous semantic concept. Predicting the likelihood that a node is a latently ambiguous semantic concept may include providing a score of latent ambiguity and including the score in the annotation of the node.

The method may include training the statistical model by determining a non-leaf node in a semantic graph together with a distance of the non-leaf node to a leaf node and applying learned lexical and/or graphical characteristics, and, optionally, training the statistical model by training at least two models using a same feature set, to evaluate a node as both a latently ambiguous node and an unambiguous node and using the two scores together to increase the accuracy of a resulting classification.

Applying a pre-defined latent ambiguity process to the node may include one of the group of: ignoring the node in the activation of the annotated semantic graph, boosting a signal for the node during the activation, and penalizing the node during the activation.

Replacing any annotated nodes indicating a latent ambiguity of the concept remaining in an output of the processing of the natural language input with an alternative node from the semantic graph may include resolving an annotated node to a sub-type node. A sub-type relationship may be followed along the activated path and the annotated node is resolved to a most highly activated sub-type node. Learned graph-metric characteristics of annotated nodes may be leveraged in order to rank alternative nodes as appropriate replacements.

A same-type path may be followed to a configurable level of depth in the annotated semantic graph and the annotated node may be resolved to a highly activated, low-latency node of the same type.

According to a second aspect of the present invention there is provided a system for latent ambiguity handling in natural language processing, comprising: a processor and a memory configured to provide computer program instructions to the processor to execute the function of components; an annotated semantic graph providing component for providing an annotated semantic graph based on a knowledge base in which nodes representing semantic concepts are linked by semantic relationships, wherein one or more nodes are annotated to indicate a latent ambiguity of the semantic concept; a graph activation component for processing a natural language input by activation of the annotated semantic graph; and a latent ambiguity processing component for during processing when encountering an annotated node indicating a latent ambiguity of the semantic concept, applying a pre-defined latent ambiguity process to the node.

The system may include a node resolving component for replacing any annotated nodes indicating a latent ambiguity of the concept remaining in an output of the processing of the natural language input with an alternative node from the semantic graph.

The annotated semantic graph providing component for providing an annotated semantic graph may include a latently ambiguous node identifying component for identifying a node having a latently ambiguous semantic concept by applying a trained statistical model for predicting the likelihood that a node is a latently ambiguous semantic concept.

The latently ambiguous node identifying component may predict the likelihood that a node is a latently ambiguous semantic concept and includes a scoring component for providing a score of latent ambiguity and including the score in the annotation of the node.

The latently ambiguous node identifying component may include a training component for training the statistical model by determining a non-leaf node in a semantic graph together with a distance of the non-leaf node to a leaf node and applying learned lexical and/or graphical characteristics.

The training component may be for training the statistical model by training at least two models using a same feature set, to evaluate a node as both a latently ambiguous node and an unambiguous node and using the two scores together to increase the accuracy of a resulting classification.

The latent ambiguity processing component for applying a pre-defined latent ambiguity process to the node may include one of the group of: ignoring the node in the activation of the annotated semantic graph, boosting a signal for the node during the activation, and penalizing the node during the activation.

The node resolving component may be for replacing any annotated nodes indicating a latent ambiguity of the concept remaining in an output of the processing of the natural language input with an alternative node from the semantic graph and may include resolving an annotated node to a sub-type node.

The node resolving component may include a sub-type relationship component for following a sub-type relationship along the activated path and resolving the annotated node a most highly activated sub-type node.

The node resolving component may include a learned characteristics component for leveraging learned graph-metric characteristics of annotated nodes in order to rank alternative nodes as appropriate replacements.

The node resolving component may include a same-type path component for following a same-type path to a configurable level of depth in the annotated semantic graph and resolving the annotated node to a highly activated, low-latency node of the same type.

According to a third aspect of the present invention there is provided a computer program product for latent ambiguity handling in natural language processing, the computer program product comprising a computer readable storage medium having program instructions embodied therewith, the program instructions executable by a processor to cause the processor to: provide an annotated semantic graph based on a knowledge base in which nodes representing semantic concepts are linked by semantic relationships, wherein one or more nodes are annotated to indicate a latent ambiguity of the semantic concept; process a natural language input by activation of the annotated semantic graph; and during processing when encountering an annotated node indicating a latent ambiguity of the semantic concept, apply a pre-defined latent ambiguity process to the node.

The computer program product may include the computer program product comprising a computer readable storage medium having program instructions embodied therewith, the program instructions executable by a processor to cause the processor to replace any annotated nodes indicating a latent ambiguity of the concept remaining in an output of the processing of the natural language input with an alternative node from the semantic graph.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described technique marks nodes in a semantic graph that exhibit characteristics of latent natural language ambiguity so that any NLP processes that leverage this graph may adapt their processing of such nodes. In one illustrative embodiment, this adaptation of their processing may include ignoring the nodes and continuing processing until the closest related and least latently ambiguous concept is identified, for example.

Figure 1:
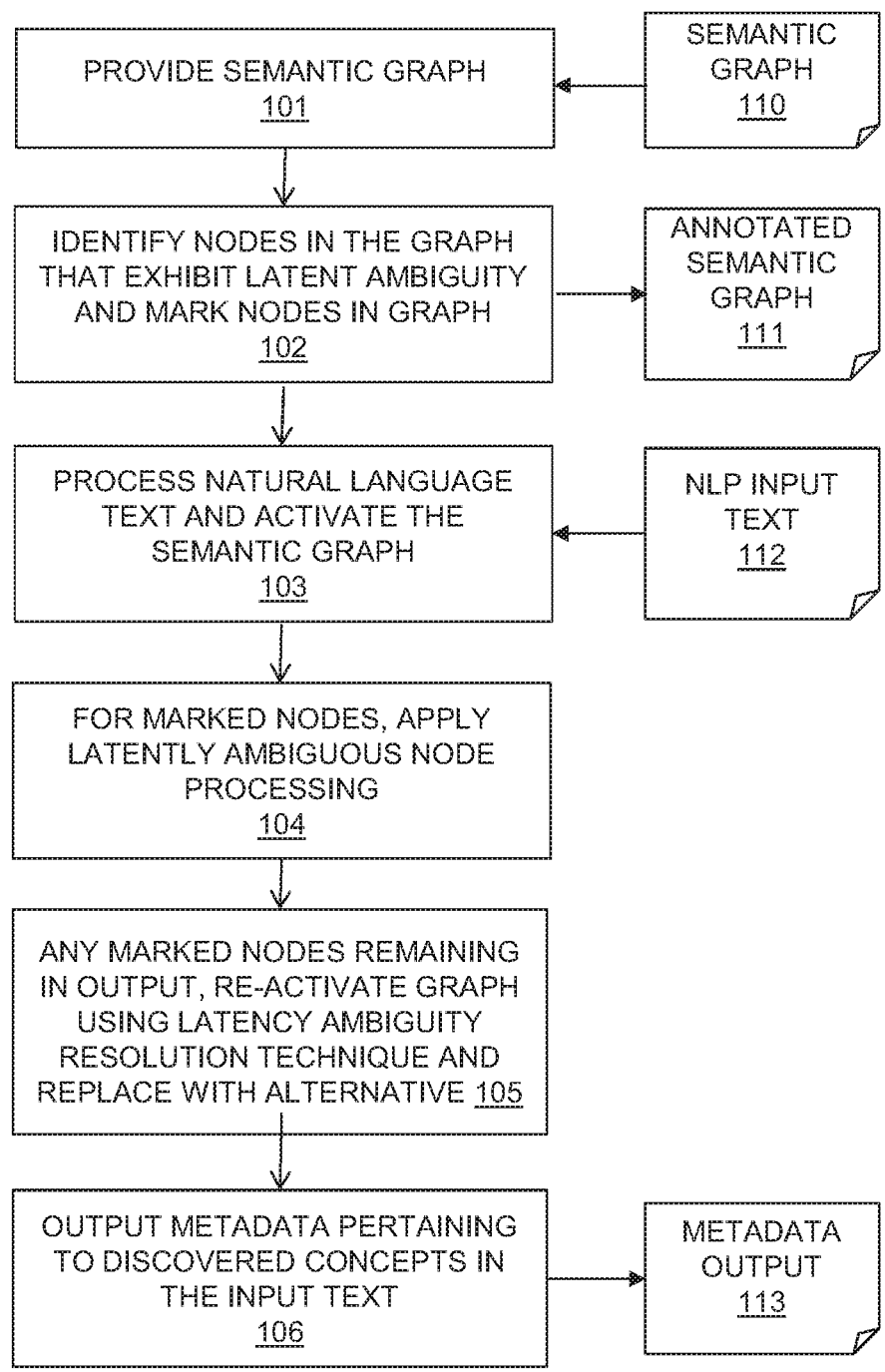
FIG. 1 is a flow diagram of an example embodiment of a method in accordance with the present invention.

Referring to FIG. 1, a flow diagram 100 shows an example embodiment of the described method. As shown in FIG. 1, the method may provide 101 a semantic graph 110. A semantic graph 110 is a graph in which the vertices or nodes represent semantic concepts, and in which the edges represent relations between the semantic concepts. Semantic graphs at the level of an ontology express vocabulary that is helpful for humans but may also be usable for machine processing, especially in natural language processing.

The method includes identifying 102 nodes in the semantic graph that exhibit characteristics of latent ambiguity and marking these nodes in the graph resulting in an annotated semantic graph 111. The marking of latently ambiguous nodes in the annotated semantic graph 111 may include a scoring on a scale of latent ambiguity. This process may be carried out as a pre-processing annotation of the semantic graph 110 that may then be used in NLP systems.

A natural language text 112 may then be input 103 for processing by activating the semantic graph as is known in the art. Spreading graph activation involves an attenuating signal moving from a starting point in the graph to adjacent nodes, and onwards until the signal has decayed entirely. Spreading activation is initiated by labeling a set of source nodes with weights or activation and then iteratively propagating that activation out to other nodes linked to the source nodes. The weights may decay as activation propagates through the graph.

As the graph activation encounters nodes of the graph that have been marked as latently ambiguous, a defined latently ambiguous node processing may be applied 104, as described further below. Latently ambiguous node processing may be carried out as part of normal spreading activation of the graph. The spreading activation is augmented to perform special handling for latently ambiguous nodes. For example, the latently ambiguous node processing may ignore the node, jump to an adjacent node, reduce or boost a signal weight, etc. A scoring of a scale of latent ambiguity provided in the annotated semantic graph 111 may be used in the processing of the latently ambiguous nodes.

Any nodes marked as latently ambiguous that remain may be replaced 105 with alternative(s) that reflect more fine-grained semantics which are obtained by re-activating the graph using latency resolution techniques to obtain a closest alternative to the latently ambiguous node. An output 113 may be provided 106 as metadata pertaining to discovered concepts in the input text 112.

Default output from the graph activation process is a modified set of annotations that are deemed most relevant to the context. For example, generally ambiguous words (like "cat" the animal, or "cat" the medical scan) in the text, with multiple overlapping annotations, would only have a single interpretation remaining. Annotations for concepts that did not appear in the text, but which following graph activation appear relevant, may also be provided.

Output in the described method may be augmented to demonstrate latent ambiguity by filtering, or otherwise reducing the relevance of, latently ambiguous concepts, and equivalently increasing the relevance of an alternative interpretation for the same concepts that is more specific.

In this method, by modifying how the graph is activated to be aware of latent ambiguity, the default output has been modified to change the annotation on the text from a latently ambiguous interpretation to one that is more specific, even if there was no clear mention of this interpretation in the text itself.

An example is in the use of the word "school" as an educational institution. In a graph that refers to specific schools like "primary school" or "university", the meaning of the word school can still be quite unclear. In the text "John Collins went to school in Navan until he was 12", this is very much the case. To resolve this using the current method, a semantic graph may be considered that contains nodes that represent concepts of geographic data for specific educational institutions (like "Navan Primary School"←(located_in)→"Navan"), along with concepts describing entrance criteria for these institutions (such as primary schools being "for ages 5 to 12", or universities "for ages 18+", etc.).

Once these concepts are identified in the text, they can be activated in the graph, and a primary school based in Navan, which accepts students under 12, will be found to be activated highly, and is therefore a good alternative interpretation of the concept "school". The output from this process will therefore be modified to reduce the importance of the "school" concept annotation, and amplify that of "Navan Primary School". This may involve removing the "school" annotation entirely, or applying a relevance score based on activation weight or other available metadata.

Latently Ambiguous Node Identification

Identification of latently ambiguous nodes in a semantic graph as described the flow diagram 100 of FIG. 1 at step 102 may be carried out by various methods or combinations of methods including the following.

Non-leaf nodes known as super-types may be identified in a semantic taxonomy. Non-leaf nodes are identified as any nodes that are hypernyms, or which semantically encapsulate any other node. This can be done in several ways. Latently ambiguous nodes are likely to be non-leaf nodes.

Generally, the links between concepts in the graph are realized by reference to an existing semantic resource, such as an ontology. However, the contents of the graph are not semantic categories but instances of these categories. Therefore, although hierarchical relationships can be represented in the graph, the underlying semantic taxonomy, if such exists, would not be immediately apparent.

Taxonomical structures in the graph can be highlighted by identifying specific relationships between concepts that exhibit "parent→child" qualities, such as [X "isA", "childOf", or "subTypeOf" Y]. In this way, a node that has no incoming "child" links can be identified as a leaf node, and the distance from a node to one of these leaf nodes can be used to measure "specificity" or latent ambiguity. Alternatively, since the underlying ontology for the semantic graph will typically rely on a Type-hierarchy schema to form the skeleton of the semantics therein, this resource can be used to infer the leaf or super-type nature of any given instance, or node in the graph, by identifying the semantic Type or category of that node, and then examining the position of this Type in the schema.

In addition to identifying non-leaf nodes, the distance from a non-leaf node to a leaf node may be measured and used in, or as, a measure of latent ambiguity of a node. Measuring distance between two nodes in the graph can be done with simple graph traversal algorithms like breadth/depth first search/Dijkstra, etc. In this case, since there is also additional metadata for context relevance and inter-concept semantics, the traversal of the graph may be weighted and augmented accordingly. For example, if a particular semantic Type does not appear in the analyzed text, paths that cross nodes of this Type may be down-weighted since they may be less semantically relevant.

Another distance measure only traverses the graph using those relationships that reflect parent-child or taxonomical structure. In a similar fashion to identifying non-leaf nodes, the original taxonomic structure from the source data for the graph can be used to amplify or reduce the distance between two nodes according to the distance between their respective Types in the type-hierarchy.

In the absence of a classifier or complex statistical analysis, the distance from a node to its closest sub-type leaf node, simply in terms of the number of intervening nodes, can be used to produce a "latent ambiguity" measure or confidence.

However, statistical analysis of all nodes identified as non-leaf nodes may be carried out which may include learned lexical characteristics and/or learned graphical characteristics. Learned lexical characteristics of latently ambiguous nodes, such as the part of speech, surrounding predicate argument structure, or language models associated with the latently ambiguous nodes, and optionally distances from such latently ambiguous nodes to leaf nodes in a domain-specific corpus, may be used as indicators of non-leaf nodes that represent latently ambiguous nodes. For example, such learned characteristics may include: commonly occurs as an argument of verb X, or commonly has part of speech=noun, or commonly occurs in this list of n-grams, or has a corpus frequency higher than Y, etc.

Learned graphical characteristics of latently ambiguous nodes may also be used to identify latently ambiguous nodes, such as node degree, edge-type variation, frequency, centrality, etc. For example, such learned graphical characteristic may include a characteristic that these nodes commonly have node-degree of value X, edge-type variation of value Y, and centrality of value Z, along with other node-centric graphical metrics.

Any node in the graph may have learned lexical and/or graphical characteristics, regardless of its connectivity, and may be a leaf node or non-leaf node. What initially defines leaf nodes is an independent taxonomical structure. If this structure is incomplete or error-prone, the method may benefit from learning characteristics of non-leaf or leaf nodes, that can then be applied in order to discover new examples of these non-leaf or leaf nodes, and potentially update the taxonomy.

The semantic graph is usually derived from some structured semantic content. In addition to graph-theoretical metrics, statistics from the underlying resource may also be helpful. One example is a count of the number of nodes that have an overlapping text value, or label, with the current node. This is another measure of ambiguity independent of context and can be evaluated as a pre-processing step.

Annotating concepts in domain text may color the results of the statistical analysis by providing features like semantic relevance of nodes to the current domain of interest, or by ensuring that the statistical analysis only uses disambiguated metadata, thereby reducing noise and improving accuracy of the process.

Using existing knowledge of hypernyms and hyponyms is akin to leveraging a taxonomy or type-hierarchy, as done in the steps of identifying non-leaf nodes and their distances to leaf nodes. Another way this may be used is in the application of such resources that were not used in the original construction of the graph. An ontology like Wordnet, describing lexical rather than contextual semantics, is useful in that it has a large amount of data on hierarchies of general word meanings (like "book" the verb or "book" the noun). Although domain-specific terminology may appear to be unambiguous, and exhibit strong leaf-node qualities (e.g. patient book), the fact that the textual labels contain words or phrases that Wordnet considers hypernyms is worth highlighting for further processing. The underlying domain-specific ontology that was used to build the graph may be incomplete.

Statistical analysis of the nodes identified as non-leaf nodes may have two potential outcomes. Firstly, in order to further identify other nodes in the graph that did not exhibit these qualities but in other respects appear to be non-leaf nodes. Secondly, in order to un-mark previously identified non-leaf nodes that are not associated strongly enough with these aggregated characteristics.

Nodes marked as latently ambiguous may have implications for further processing. Even if the semantics of the underlying ontology were not detailed enough to identify them as such, it makes sense to highlight these if possible, and by extension, to remove their marking as a non-leaf node if confidence is low.

Machine learning or deep learning classifiers can use the above described features to produce a confidence that any given node in the graph is a non-leaf node. It should be appreciated that the above list of possible features is not exhaustive, and other features may be utilized with, or alternative to, one or more of the above features. For example, other features may include any corpus derived data such as Word2vec or Lucene index statistics.

Figure 2:
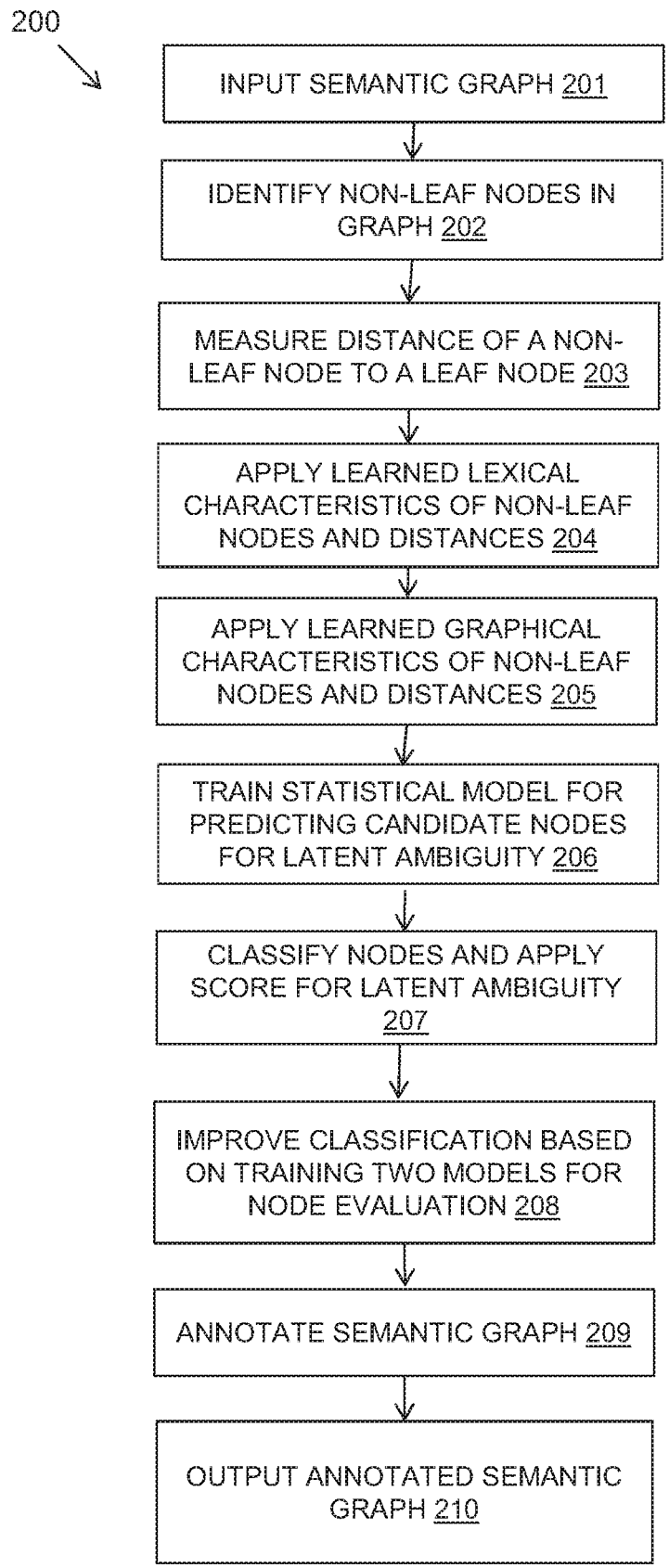
FIG. 2 is a flow diagram of an example embodiment of an aspect of a method in accordance with the present invention.

FIG. 2 shows a flow diagram 200 of an example embodiment of identification of latently ambiguous words in a semantic graph. As shown in FIG. 2, a semantic graph may be input 201 and non-leaf nodes may be identified 202 together with the distances 203 of the non-leaf nodes to leaf nodes. This information may be used to apply learned lexical characteristics 204 and/or learned graphical characteristics 205.

The above features, or other such features derived from the graph structure, semantic content, corpus statistics, or other lexical features, may then be used to train 206 a statistical model for predicting the likelihood that any given node in an unseen portion of the graph may be a likely candidate for latent ambiguity. Nodes may be classified 207 accordingly and scored for latent ambiguity.

The classification and scoring may be improved 208 by using positive and negative examples to train at least two models using the same feature set, to evaluate a node with regard to the node being a latently ambiguous node and with regard to the node being an unambiguous node. The two scores may then be used together to increase the accuracy of this classification.

In the statistical analysis, classifiers may be trained to provide a confidence score that a node was not a leaf-node. The same features can similarly be used to train a classifier to provide a confidence that any given node actually is a leaf node. The use of both confidence scores simultaneously can help to improve accuracy in edge cases. For example, consider a node that has a low "non-leaf node" confidence score but also has a low "leaf-node" confidence score. The system may be configured to take a cautious approach and treat such nodes as non-leaf nodes by default. The resulting score from such a classification may also be used to configure how the spreading activation signal is modified, by controlling the weight of boost/decay according to the value of the score.

The semantic graph may be annotated 209 to mark the nodes as latently ambiguous and optionally to provide scoring of the latent ambiguity. The annotated semantic graph may be output 210 for use in NLP.

NLP of Input Text

A natural language text may be input for processing and semantic entities in the natural language text may be identified with unique identifiers (IDs) that correspond to individual nodes in the semantic graph. The set of identified IDs are then used as starting points for graph "activation", where an attenuating signal moves from each starting point to adjacent nodes, and onwards, until the signal has decayed entirely. As a result of the spreading activation of the graph, a set of nodes that were not in the original input natural language text will also now be highlighted. Given a semantic graph, the implication is that these new nodes are semantically related to the input.

There are many different implementations of spreading activation in existing art/literature that control, to different degrees, how the signal will spread, what the signal is made of, how the signal will be amplified or penalized at different types of node, etc. For example, should a node encountered in activating the graph have an associated semantic category that is not shared by any of the nodes/IDs identified in the input text, then it can be assumed that this node is therefore unrelated and worth penalizing, and the signal will be made to decay faster as it traverses such nodes.

In the described method, given the identification of latently ambiguous nodes, these nodes can be treated differently whenever they are activated.

Processing of Latently Ambiguous Nodes

Identified latently ambiguous nodes may have differences in implementation as configurable toward the resolution of latent ambiguity. Some examples of latently ambiguous node processing may include one or more of the following:

(1) Ignore such nodes entirely, and simply propagate the signal to the next adjacent nodes without boosting/decaying the signal, as if such a node did not exist in the graph;

(2) Boost the signal so that it will travel further from this point and potentially activate another node that is a less ambiguous sub-type (e.g. school vs Oristown primary school, Kells); or (3) Penalize such nodes so that they are less likely to influence system output, such as in IR query building or named entity inference.

In one embodiment, after the pre-processing of the graph is complete, a set of nodes has been identified in the graph that should be penalized since they are latently ambiguous. For example, an implementation of a semantic graph may allow the specification of a node-specific weight, or decay factor. Whenever a signal traverses this node, the degree to which the signal decays may be modified by this weight, which is implemented as a multiplier. The graph may be modified up front to reduce the decay factor on latently ambiguous nodes so that the signal will travel further. Alternatively, the factor may be set to 0, preventing the signal from travelling any further at all. The confidence scores from classification of leaf/non-leaf nodes may also be used here to configure an appropriate decay factor.

Figure 3:
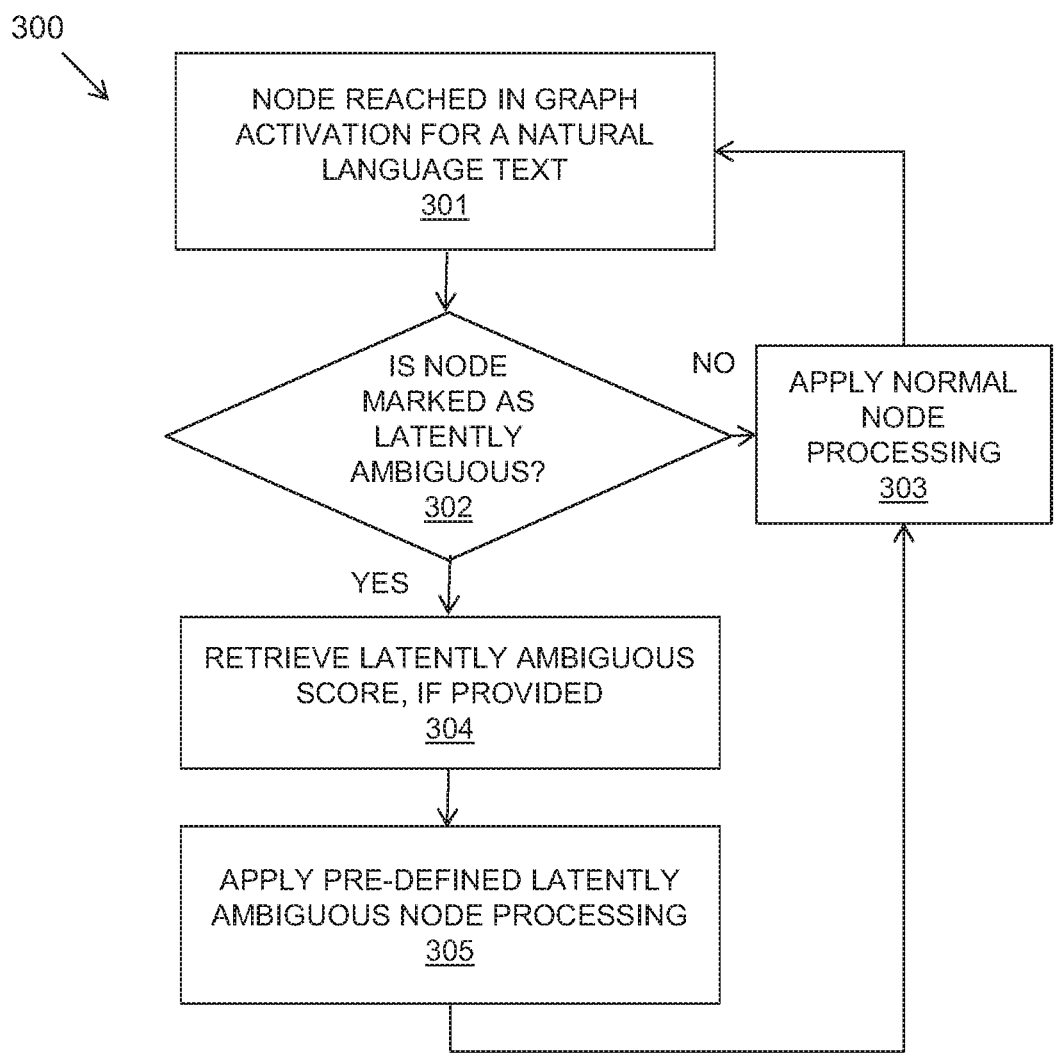
FIG. 3 is a flow diagram of an example embodiment of an aspect of a method in accordance with the present invention.

Referring to FIG. 3, a flow diagram 300 shows an example embodiment of an adapted activation process using an annotated semantic graph annotated with latently ambiguous nodes, such as described in the flow diagram 100 of FIG. 1 at steps 103 and 104, for example. As shown in FIG. 3, during semantic graph activation for an input natural language text, a node may be reached 301 in the activation. It may be determined 302 if the node is marked as latently ambiguous. If it is not marked, it may be processed 303 as a normal node and the method may loop to a next node 301. If a node is marked as latently ambiguous, a latent ambiguity score may be retrieved 304, if provided. Pre-defined latent ambiguity processing may be applied 305 to the node, which may include using a latent ambiguity score. The method may then loop to a next node 301.

Resolving Latent Ambiguity

Figure 4:
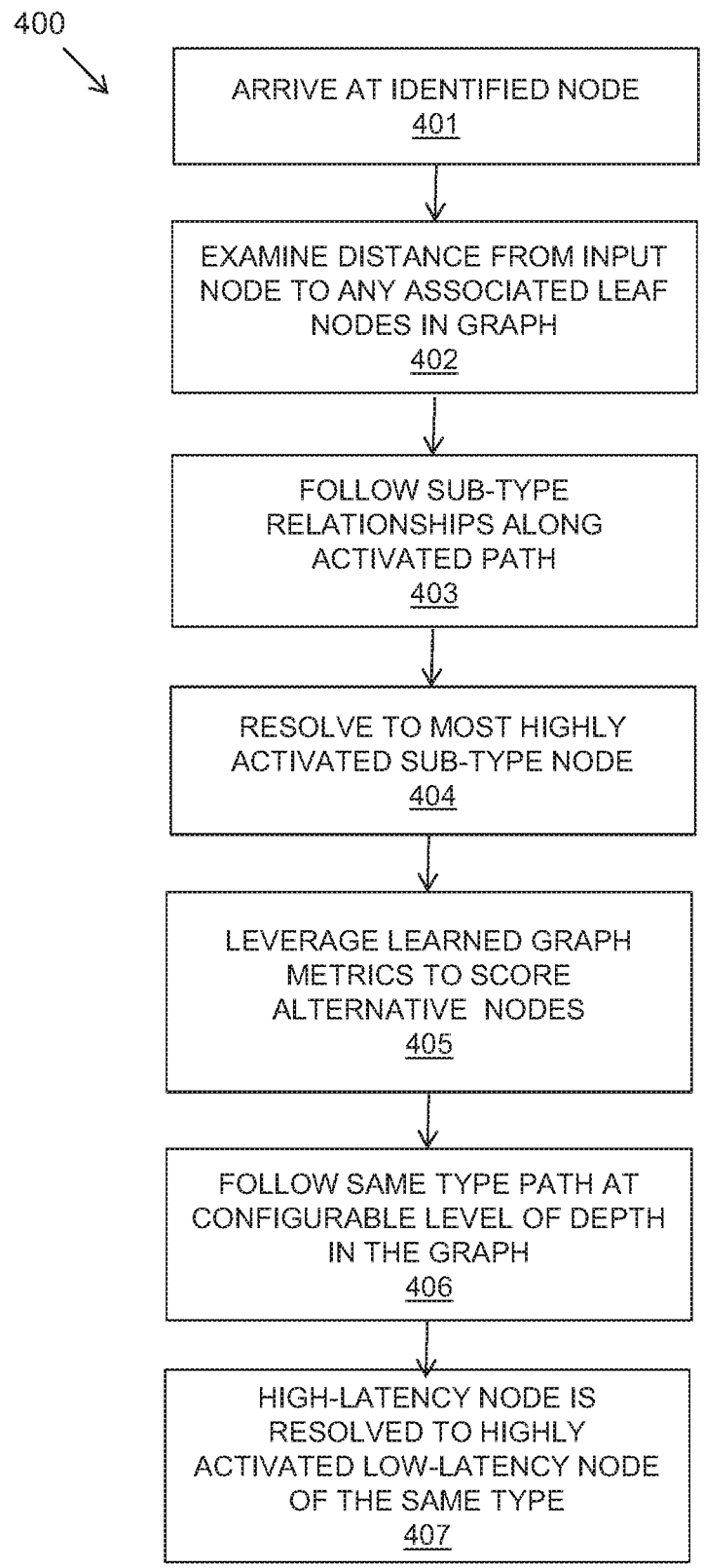
FIG. 4 is a flow diagram of an example embodiment of an aspect of a method in accordance with the present invention.

Referring to FIG. 4, a flow diagram 400 shows an example embodiment of a resolution of latently ambiguous nodes, such as described in the flow diagram 100 of FIG. 1 at step 105, for example. As shown in FIG. 4, during semantic graph activation, the activation may arrive at an input node identified as a latently ambiguous node 401. The distance from the input node to any associated leaf nodes in graph may be measured 402, wherein a leaf node is one with no outgoing sub-type relations. In the absence of a classifier or complex statistical analysis, the distance from a node to its closest sub-type leaf node, simply in terms of the number of intervening nodes, can be used to produce a "latent ambiguity" measure or confidence. Alternatively, statistical analysis or a predictive classifier may provide a measure or confidence.

A sub-type relationship may be followed 403 along the activated path. The node may be resolved 404 to a most highly activated (semantically relevant), sub-type node. Learned graph-metric characteristics of latently ambiguous nodes may be leveraged 405 in order to rank alternative nodes as appropriate replacements. The set of alternative nodes for any identified latently ambiguous node may be ranked according to their respective latent ambiguity using the scores generated in the prior static analysis of the graph. However, it should be appreciated that there can be many nodes that exhibit an identical or very similar score, for example with siblings in a taxonomical hypernym/hyponym structure. Thus, the context of the document content may be used as a more accurate differentiator. As the graph is activated at nodes that occur in the text, the accumulation of signal following spreading activation is a good measure of contextual relevance for the set of alternative nodes.

In addition to this, many of the features from pre-processing statistical analysis may be used, in order to further distinguish the better alternative nodes. For example, by using graph theoretical metrics, it may be found that the in/out degree (number of incoming/outgoing links) of a node may be directly proportional to its latent ambiguity and inversely proportional to its usefulness as an alternative node.

A same-type path may be followed 406 to a configurable level of depth in the graph. The high-latency node may be resolved 407 to highly activated low-latency node of same type.

Every node in the graph has an associated (or multiple such) semantic Types. For instance, the semantic concept of "Paracetamol" has multiple semantic categories in the UMLS ontology, such as "Ingredient", "Pharmacologic Substance", "Chemical Compound", "Treatment", etc. When traversing the graph, in one implementation navigating the graph may involve using only those nodes that have semantic Types that were also present on the original ambiguous node. This limits the set of alternative nodes to those which are a sub-type of the starting node, and are therefore more likely to be hyponymous, and a more specific meaning of the original node. This path finding method can be used irrespective of the label on the relationship between nodes.

This greatly improves natural language processing output and fine-grained semantic labeling. High quality parsing, anaphora resolution, query composition and expansion, word-sense disambiguation, named entity detection, inference, etc.

The following points provide more detail on the benefits of both detecting latent ambiguity and resolving latent ambiguity. Detecting and resolving latent ambiguity improves the accuracy of any task that depends on fine-grained semantics, such as natural language question answering, semantic search, word-sense disambiguation, query expansion, parts of speech tagging, parsing, etc. By virtue of the semantic graph structure, it is possible to continue processing and bias the use of related concepts that are more helpful than the latently ambiguous word.

Characteristics of latent natural language ambiguity can be learned from statistical analysis of a gold-standard corpus of known general-meaning concepts, in conjunction with the associated graph structure for these concepts, and associated values for node-based metrics. An unsupervised alternative may use heuristics for semantic generality measures in the graph structure: high node connectivity, high frequency of lexical coverage in the domain corpus, etc. A useful measure for such heuristics may be the relative distance from a node in the graph to the nearest "leaf node", or node with no out-going sub-type or hyponym link.

The idea of a semantically general word which is latently ambiguous is similar to that of hypernymy in lexical semantics. Characteristics of hypernyms may also be predictive in the above procedure, and may be examined in the context of the corpus, using a resource like Wordnet.

Since a type of semantic inference is performed, using the ambient semantics of nodes in the graph, this method is relevant for other inference or prediction based processes such as Ellipsis Resolution, Homophora/Anaphora/Exaphora Resolution.

The spreading activation process typically starts from nodes that represent concepts present in text. However, as the semantic graph contains many other concepts in a structure that reflects the relationships between concepts, the number of activated nodes following this process is much greater than the set of those that originally occurred in the text. If the additionally activated nodes are activated above a standard threshold they may be considered to be relevant by semantic inference. This is a natural by-product of any spreading activation technique performed on a semantic graph. Since this described method is latent-ambiguity aware, there are consequences for how the same output may be used.

Some common related problems in NLP are due to style of writing, where entities are replaced with pronouns that may (anaphora) or may not (exophora) be present in the same document, where a full exhaustive expression is deemed unnecessary (ellipsis or " . . . "), and where an idiom or phrase's meaning is referring, in an indirect way, to something not directly mentioned in the text (homophora, e.g. idioms). The above issues are very similar to latent ambiguity, and the described method can be used to resolve them very easily. Entities that are missing from the text, but inferred as relevant following spreading activation, can be linked back to particular portions of the text in order to replace ellipsis, exophora or homophora usage. Anaphoric references can be similarly resolved to a greater degree of specificity using this invention.

For example, in the sentences "John went to school in Navan until he was 12. He loved it.", when "school" is resolved to be a specific primary school, the anaphora resolution of the word "it" becomes the same specific institution. In large documents where the use of shorter textual forms becomes commonplace, in order to save time, space, and improve readability, this technique becomes even more helpful.

The semantic graph is an inherently deictic structure. Semantic inference is a consequence of the most basic graph traversal. The concept of a deictic center, or the central theme around which the context of a vague or ambiguous sentence will make sense, is analogous to the focus node in IBM® Galaxy's (IBM and Galaxy are trademarks of International Business Machines Corporation of Armonk, N.Y.) spreading activation technique over a semantic graph.

Deixis refers to words whose meaning will change depending on the context. However, this term is normally reserved for pronouns ("me", "he", "she", etc.). Once aware of latent ambiguity, it can be shown that nouns which are not commonly referred to in this fashion, are no less contextually sensitive. The example "school" as an education institution has been used several times here, to show this. For this reason, any non-leaf node in the semantic graph can be demonstrated to exhibit similar deictic qualities to pronouns. For this reason, the semantic graph is considered to be inherently deictic in nature when it describes domain vocabulary that can vary in specificity.

As the graph is activated, using concepts discovered in text, and the mostly highly weighted node where the signal accumulates to the highest degree is discovered, this most highly weighted node can be used as a relevance anchor in a similar manner to that of a deictic center for the text. Latently ambiguous nodes that exhibit deictic qualities can be replaced with more specific interpretations that have a close distance to the anchor node.

The terminology used in IBM Galaxy refers to this node as the "focus node", and uses this technique for word-sense disambiguation at a high level, e.g. "school" to be "school of fish" or "educational school".

Instance ambiguity, where multiple alternative meanings are proposed, is a potential complexity that arises here. The illustrative embodiments described herein resolve the instance ambiguity using a two-step word sense disambiguation (WSD) process. For example, a word like "school" can have multiple meanings that need to be disambiguated first ("school of fish" vs "educational school") before proceeding to resolve the latent ambiguity. The two-step process is firstly to leverage a default implementation of WSD (such as IBM Galaxy using spreading activation), so that one principal meaning of the term "school" is obtained, and then to use the techniques described herein to resolve the latent ambiguity and find a more specific interpretation of "school", such as "primary school" or "Navan Primary School", depending on the context.

Building on existing state of the art techniques in configuration of spreading activation, the best alternative interpretations may be found very accurately and efficiently. By leveraging the semantic structure of the graph, and activating this graph with the context of the document content, it is not required for all the facts to directly exist in the text. Their relatedness may be inferred from the semantics described in the graph.

The method may include the use of complimentary techniques in evaluating semantic generality or vagueness, such as hypernym pair evaluation using topic coherence or counting the number of different levels in a semantic hierarchy. These would constitute additional helpful features in the context of detecting and resolving latent ambiguity.

Existing art in the field of hypernym/hyponym discovery can be helpful in scoring any given node as latently ambiguous. This is intended as part of the pre-processing step that finds latently ambiguous nodes in the graph up front.

One example is topic coherence where the relevance of a word to a given general topic or hypernym is evaluated by the distance between two numerical representations of words, as in word2vec matrices: one vector that represents the topic or hypernym, and another that represents the subtraction of a potential hyponym from the topic. The closer the two word vectors, the less likely this candidate was a hyponym or sub-type, since the integrity of the topic vector remains unaffected.

An example of this is in comparing the vector for "animal" with a vector representing "animal" minus the vector representing "lion". Since these two vectors will now be very different, it suggests that the "lion" vector represented a fundamental part of "animal", and can therefore be considered a sub-type or hyponym.

Example

An example is described which further illustrates the described method. For this example, consider the sentence "Where can my teenage daughter go to school?" This text may be annotated with multiple meanings for several words, such as "school", as described previously. The described method and mechanisms of the illustrative embodiments may be applied to the process of word sense disambiguation, in order to maximize the granularity of semantic detail in the output. The application of this method and mechanisms may involve the following operations:

1. Identify instances/nodes in the graph that are latently ambiguous. In this case, it might be found that "school", which has a high frequency of instances in the Education corpus, and is highly connective in the underlying semantic graph, should be considered one of these. It is marked as such with additional metadata in the node on the graph.
2. The graph is activated (e.g., IBM Galaxy and Focus Node for WSD) and the most likely interpretation of each word in context is received.
3. One of the concepts provided in the output is the same "school", previously identified as latently ambiguous, even though there was only one obvious meaning for this word in the sentence.
4. The graph may be re-activated at this node, with a special activation strategy that reflects the desired characteristics of a more fine-grained interpretation, similar to hyponym, for the node "school".
5. A set of closest unambiguous nodes to the overall context (or a single one) may be selected, by evaluating semantic distance from each suggestion to the focus node.
6. As a result it is found that concepts with the following surface forms have become relevant: "community college", "secondary school", etc. which is an improvement on the more general concept of "school".

Further considerations:

1. Although words like "my", "daughter" and "teenage" are also inherently (and latently) ambiguous, they are beyond the immediate scope of the context above. However, given suitable detail in a given semantic graph, where family history and background information are available, it is possible to build a more detailed graph that reflects this background context, and thereby produce a more accurate interpretation of a word. The same method may apply to the detection and resolution of latent ambiguity:

"my" becomes "40 year old computer programmer with 2 children (1 boy, 1 girl) drives a Renault Clio, lives in Navan, etc.";
"daughter" becomes the known entity "14 year old Sarah, with aspergers, and allergic to eggs";
"teenager" becomes "14 year old".

2. Word Sense Disambiguation

The school took a trip to water world, to see the fish.

John Smith, a student of Tankardstown High School, is a fan of dolphins. He and his school mates enjoyed the trip to water world, California.

3. Question Answering

Where can high school students go to see dolphins?

4. Parsing and Anaphora Resolution

"John went swimming with the dolphin, and his school came too".

Ambiguous language exists in every domain and thus, it is important in each domain to be able to disambiguate word senses, e.g., to discover that "school" refers to either an educational institutions or a group of fish. It is reasonable to expect that this sentence can be disambiguated given suitable background context. The context can come from the following example sentence: "It is known that educational schools can go on trips to do educational activities such as a visit to an aquarium." On its face, it is now known that school is an educational institution rather than referring to a possible dolphin group. A normal process of word-sense disambiguation is finished here, but there is still latent semantic ambiguity, as it is not known to which school the text is referring.

Often in such cases, it is not known that there still exists an amount of ambiguity in the terminology. The word "school" might not be a label for any other entity in the graph other than the general sense of the meaning. Similar to the concept of "pain medication" in medical domain, although it seems unambiguous, in that this phrase is superficially easy to understand, the possible interpretations on further semantic granularity for this concept are manifold, e.g., "pain medication" may refer to an anti-inflammatory, an analgesic, etc.

In question answering, as fine-grained a semantic interpretation as possible is relied upon. Thus, for example, if a person is asks a question directed to the drug Paracetamol™, it makes sense to look up analgesic rather than anti-inflammatory related documents. However, if "pain medication" is the only input, this can be marked as latently ambiguous, and it may be specified that the correct document need not necessarily contain this term.

In a semantic search, if the semantic search manages to index the most fine-grained semantic meanings of words, better search results will be achieved, e.g., where "school" is helpfully resolved to the specific instance of high school. So in both query composition and background indexing, benefit can be gained from more fine-grained semantics.

Likewise for other complex NLP tasks, such as parsing, if it is learnt to correctly disambiguate a context, the correct anaphoric reference for a pronoun can be more easily inferred and, as a result, a better parse tree may be drawn, which also has a more fine-grained and helpful semantic label.

Example in Graph

Figure 5A:
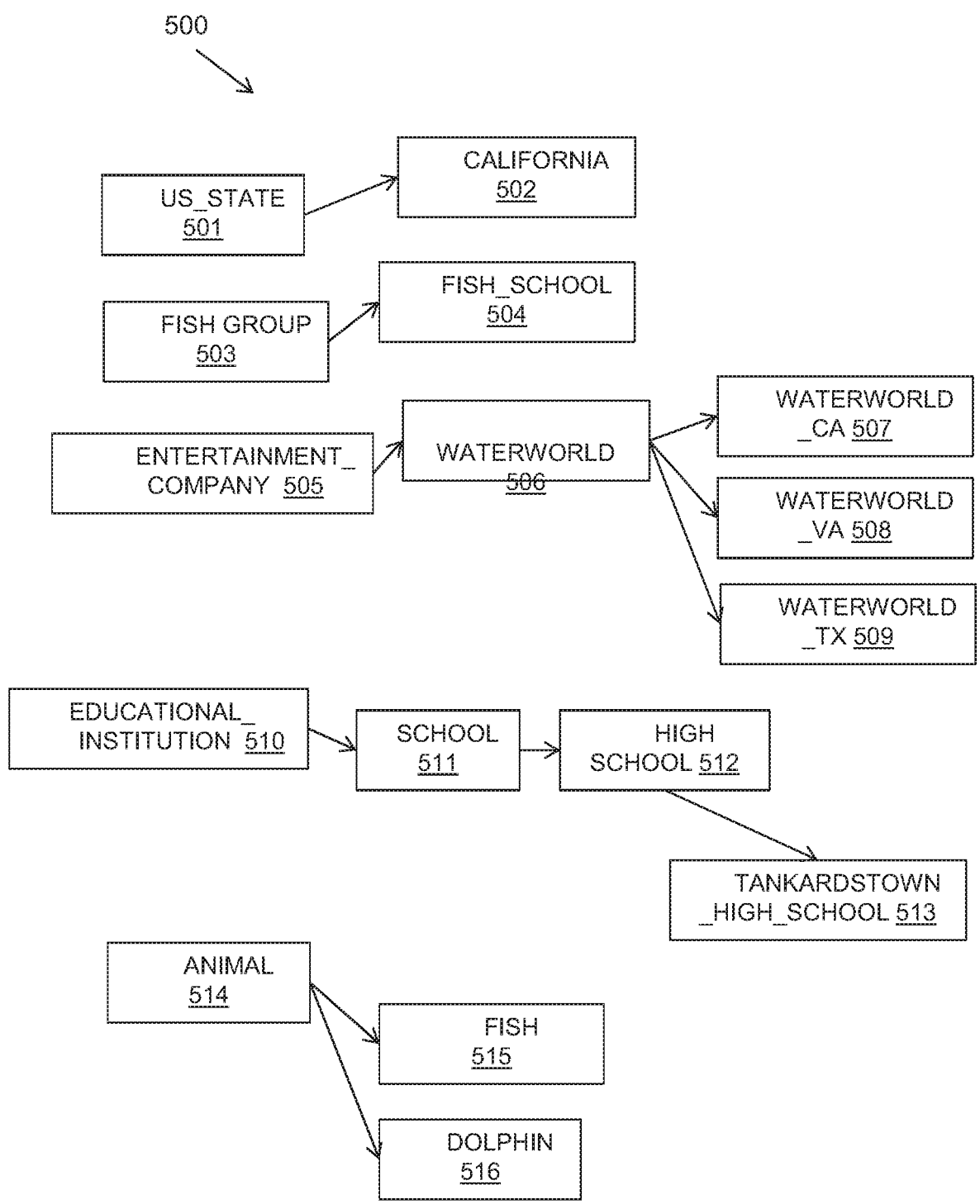
FIGS. 5A to 5D are schematic diagrams of extracts of a taxonomy and semantic graphs illustrating an example embodiment of the present invention.

FIG. 5A shows an extract 500 of a taxonomy with nodes linked by edges representing hierarchical relationships between the nodes. Each node 501-516 represents instances of the Types of Thing. As the relationships between the nodes is hierarchical, there is one arrow from a parent node to a child node, for example from "Waterworld" 506 to "Waterword_CA" 507. In this example, there are three child nodes of "Waterworld" 506 in the same level of the hierarchy, namely "Waterworld_CA" 507, "Waterworld_VA" 508 and "Waterworld_TX" 509.

Figure 5B:
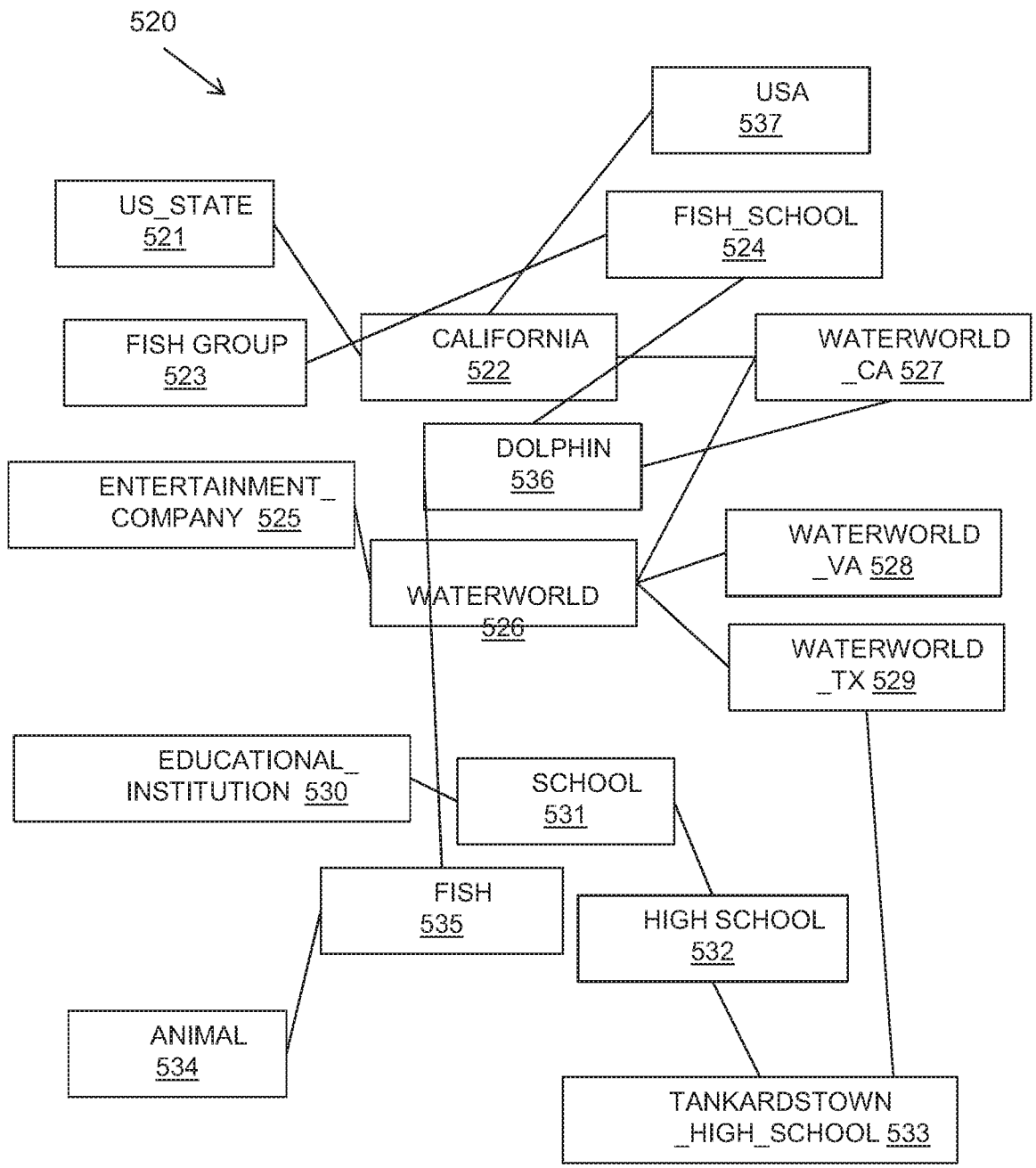

FIG. 5B shows an extract 520 of a semantic graph which may be built based on the taxonomy 500 with corresponding nodes 521-536 representing instances of the Types in the form of semantic concepts. In addition, further semantic concept nodes such as "USA" 537 may be added which were not in the taxonomy but help spread the signal when activating the graph. In the semantic graph 520, the nodes 531-537 are linked by semantic relationships which may join any two nodes and may include but are not restrained by hierarchical relationships. Links between nodes are shown to denote semantic relationships including: parent-child links (X superTypeOf Y), instanceOf links, geographic containment (X contains Y, or X located in Y), "has collective grouping" relationship (such as "dolphin" has collective grouping "fish_school"), "lives at" link (such as "dolphin" lives at "Waterworld").

Figure 5C:
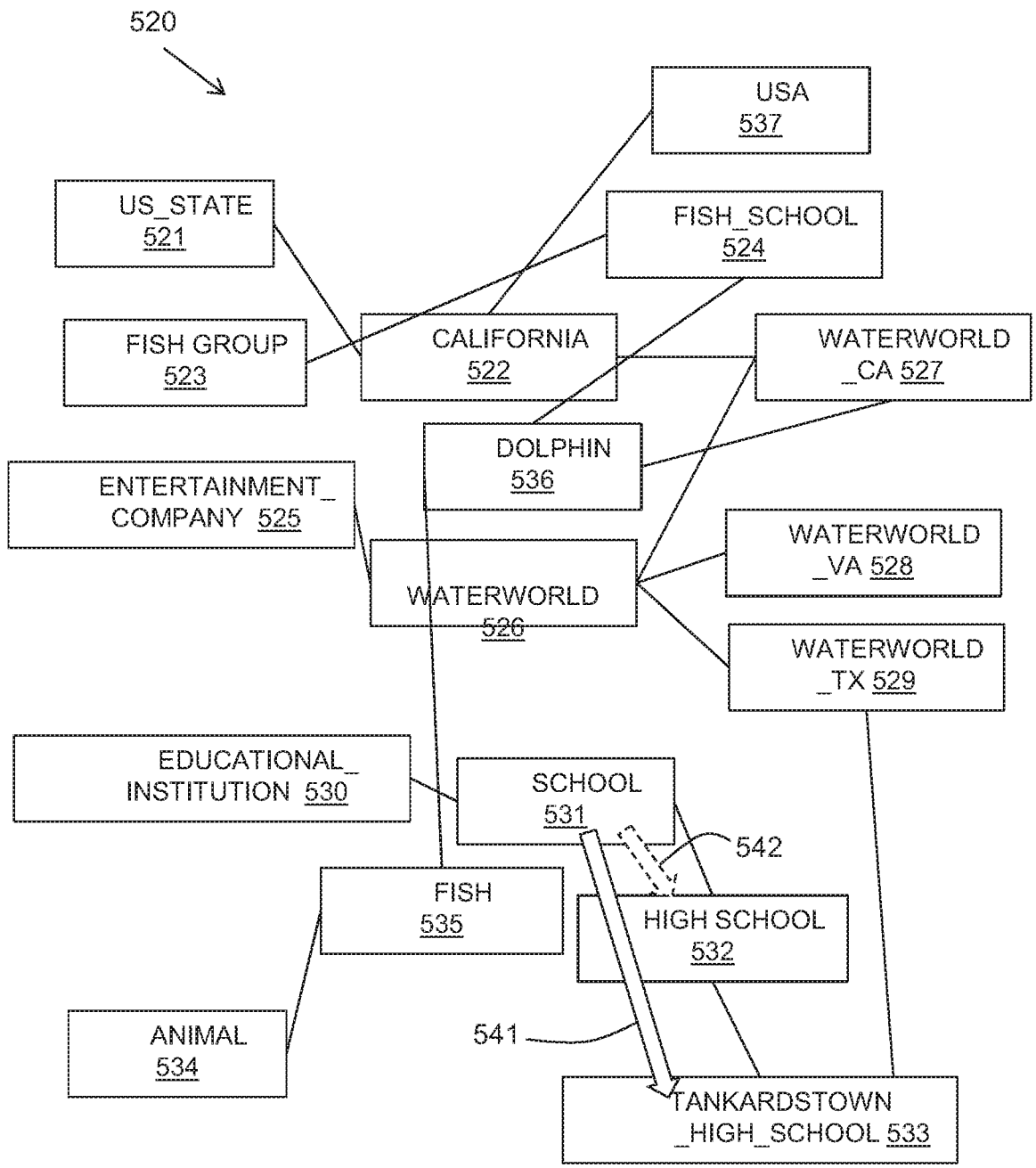
Figure 5D:
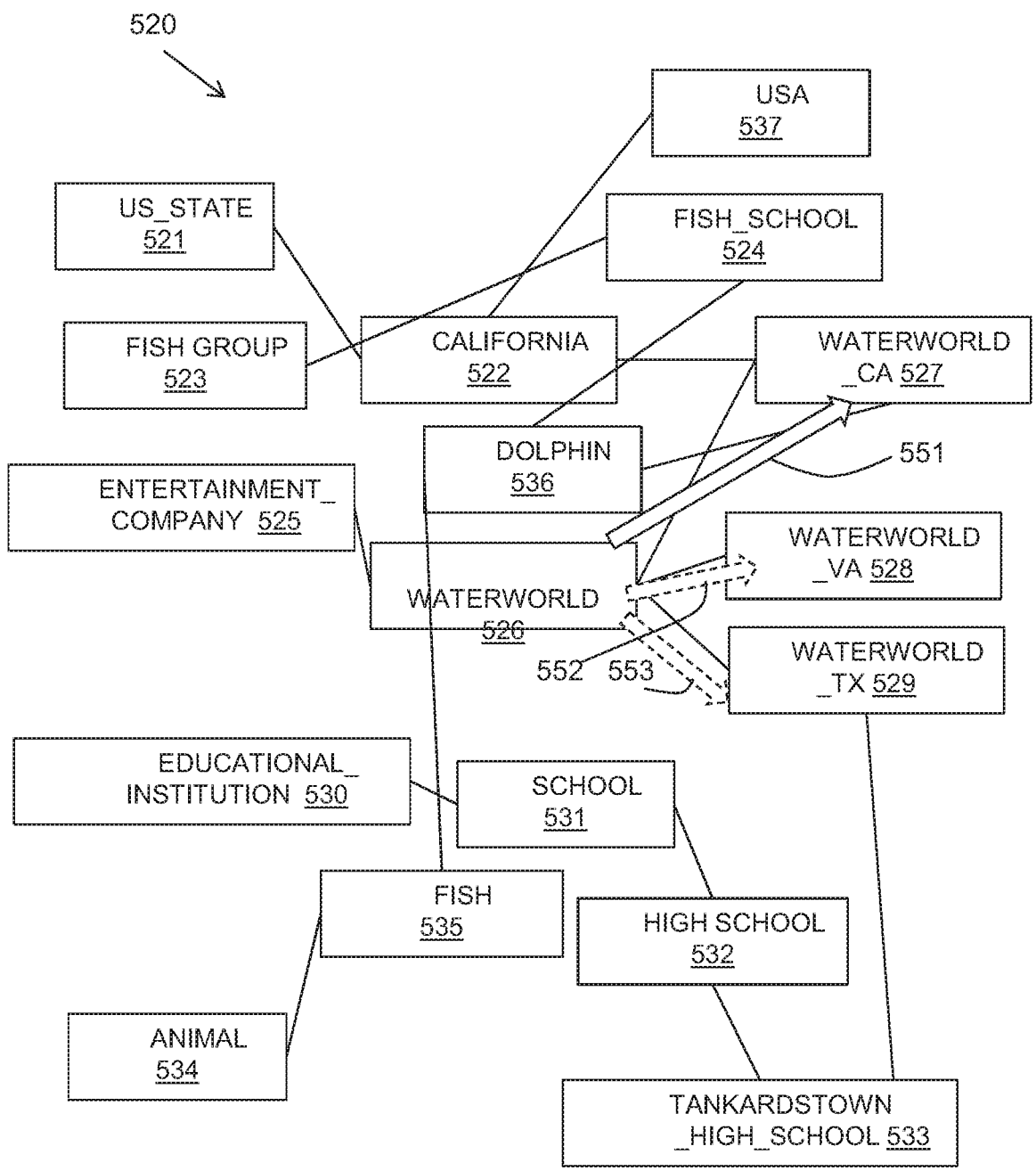

Using the context provided in the text examples, a background semantic graph may be activated, and word-senses disambiguated. Referring now to FIGS. 5C and 5D, in the example shown in FIG. 5B, two latently ambiguous words are "school" 531 and "Waterworld" 526, which have various possible interpretations:

1. Does "school" mean high school or university?
2. Does "Waterworld" mean Waterworld the theme park, or the movie?

Having discovered this latent ambiguity, the interpretations of each word may be scored according to their latent ambiguity.

Referring to FIG. 5C, "School" 531 is a hypernym one step away 541 from the nearest leaf node "Tankardstown high school" 533, so it may suggest a weighting of 0.5, or 1/(number of levels from leaf node+1). "School" 531 may also be resolved to "High School" 532 with a weaker outcome 542.

Referring to FIG. 5D, similarly, "Waterworld" 526 may be resolved to "Waterworld_CA" 527, "Waterworld_VA" 528 or "Waterworld_TX" 529 as shown by arrows 551, 552, 553. However, the resolution results in a higher scoring for "Waterworld_CA" 527 due to other mentions of "California" in the activation of the graph. This may go further also, and choose to prefer an interpretation that is more fine-grained while maintaining semantic relevance in the context.

The words "school" 531 and "Waterworld" 526 can now be resolved to "Tankardstown high school" 533 and "Waterworld in California" 527 accordingly, as the nearest leaf nodes that are activated in the graph with the higher weights. In the area of natural language processing, this method makes a significant improvement on the detection of the real meaning of words as used in a specific context.

Figure 6:
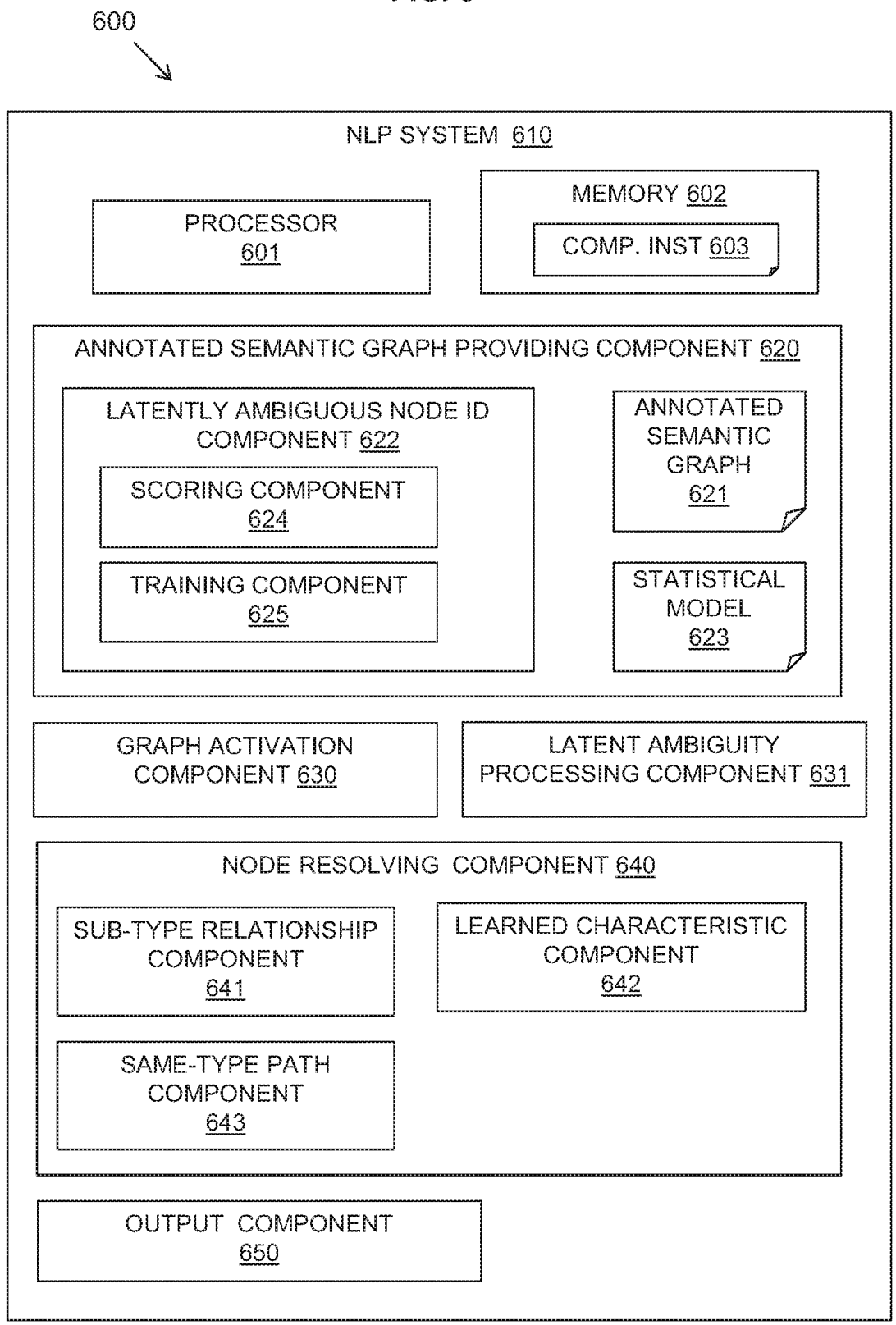
FIG. 6 is block diagram of an example embodiment of a system in accordance with the present invention.

Referring to FIG. 6, a block diagram shows an example embodiment of the described system 600. As shown in FIG. 6, a natural language processing (NLP) system 610 may include at least one processor 601, a hardware module, or a circuit for executing the functions of the described components which may be software units executing on the at least one processor. Multiple processors running parallel processing threads may be provided enabling parallel processing of some or all of the functions of the components. Each component may be arranged to provide the described functionality. Memory 602 may be configured to provide computer instructions 603 to the at least one processor 601 to carry out the functionality.

The NPL system 610 may include, or have access to, an annotated semantic graph providing component 620 for providing an annotated semantic graph 621 based on a knowledge base in which nodes representing semantic concepts are linked by semantic relationships. The annotated semantic graph 621 may include nodes that are annotated, for example using metadata, to indicate a latent ambiguity of the semantic concept and optionally a score of the latent ambiguity. The annotated semantic graph providing component 620 may be provided as part of a semantic graph creation system or as an independent system for augmenting by adding additional annotating metadata to an existing semantic graph.

The annotated semantic graph providing component 620 may include a latently ambiguous node identifying component 622 for identifying a node having a latently ambiguous semantic concept by applying a trained statistical model 623 for predicting the likelihood that a node is a latently ambiguous semantic concept. The latently ambiguous node identifying component 622 may predict the likelihood that a node is a latently ambiguous semantic concept and may include a scoring component 624 for providing a score of latent ambiguity and including the score in the annotation of the node. The latently ambiguous node identifying component 622 may include a training component 625 for training the statistical model 623 by determining a non-leaf node in a semantic graph together with a distance of the non-leaf node to a leaf node and applying learned lexical and/or graphical characteristics. The training component 625 for training the statistical model 623 may train at least two models using a same feature set, to evaluate a node as both a latently ambiguous node and an unambiguous node and using the two scores together to increase the accuracy of a resulting classification.

The NLP system 610 may include a graph activation component 630 for processing a natural language input by activation of the annotated semantic graph 621.

The NLP system 610 may include a latent ambiguity processing component 631 which, in response to encountering an annotated node indicating a latent ambiguity of the semantic concept during processing, applies a pre-defined latent ambiguity process to the node. For example, the latent ambiguity processing component 631, when applying the pre-defined latent ambiguity process to the node, may apply processing to ignore the node in the activation of the annotated semantic graph, boost a signal for the node during the activation, and/or penalize the node during the activation.

The NLP system 610 may include a node resolving component 640 for replacing any annotated nodes indicating a latent ambiguity of the concept remaining in an output of the processing of the natural language input with an alternative node from the semantic graph. The node resolving component 640 may resolve an annotated node to a sub-type node. The node resolving component 640 may include a sub-type relationship component 641 for following a sub-type relationship along the activated path and resolving the annotated node a most highly activated sub-type node.

The node resolving component 640 may further include a learned characteristics component 642 for leveraging learned graph-metric characteristics of annotated nodes in order to rank alternative nodes as appropriate replacements. The node resolving component 640 may also include a same-type path component 643 for following a same-type path to a configurable level of depth in the annotated semantic graph and resolving the annotated node to a highly activated, low-latency node of the same type.

The NPL system 610 may include an output component 650 for outputting the result of the NPL system 610 processing of the natural language input.

Figure 7:
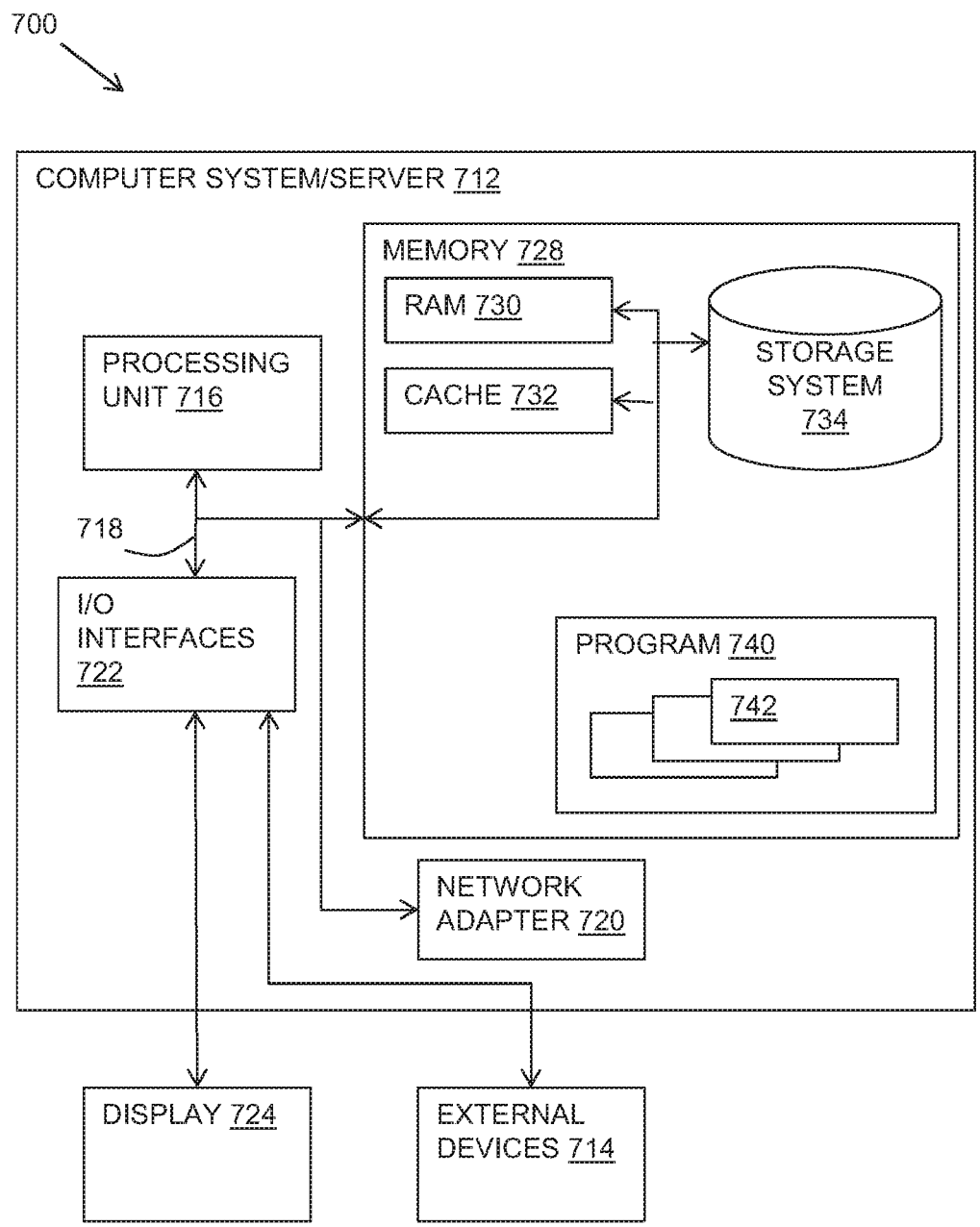
FIG. 7 is a block diagram of an embodiment of a computer system or cloud server in which the present invention may be implemented.

Referring now to FIG. 7, a schematic of an example of a system 700 in the form of a computer system or server is shown. As shown in FIG. 7, a computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that the mechanisms of the illustrative embodiments may be implemented in various data processing environments including distributed client/server type data processing systems, cloud based data processing systems, stand alone computing devices, or the like. It should further be appreciated that although this disclosure includes hereafter a detailed description on cloud computing, implementation of the teachings recited herein are not limited to a cloud computing environment. Rather, embodiments of the present invention are capable of being implemented in conjunction with any other type of computing environment now known or later developed and the description of a cloud computing environment embodiments is for illustrative purposes only.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

1. On-demand self-service: a cloud consumer can unilaterally provision computing capabilities, such as server time and network storage, as needed automatically without requiring human interaction with the service's provider.

2. Broad network access: capabilities are available over a network and accessed through standard mechanisms that promote use by heterogeneous thin or thick client platforms (e.g., mobile phones, laptops, and PDAs).

3. Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

4. Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

5. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

1. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

2. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

3. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

1. Private cloud: the cloud infrastructure is operated solely for an organization. It may be managed by the organization or a third party and may exist on-premises or off-premises.

2. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

3. Public cloud: the cloud infrastructure is made available to the general public or a large industry group and is owned by an organization selling cloud services.

4. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
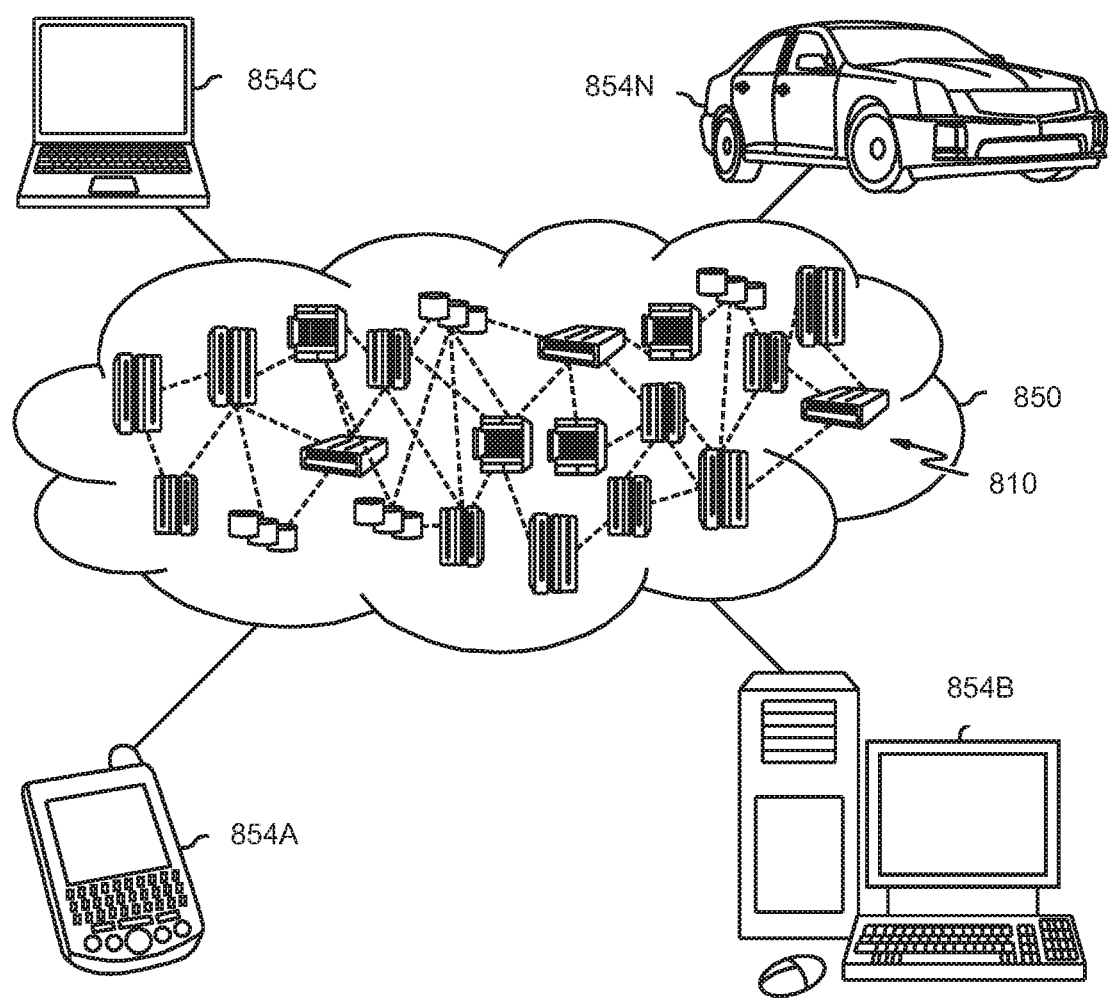
FIG. 8 is a schematic diagram of a cloud computing environment in which the present invention may be implemented.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
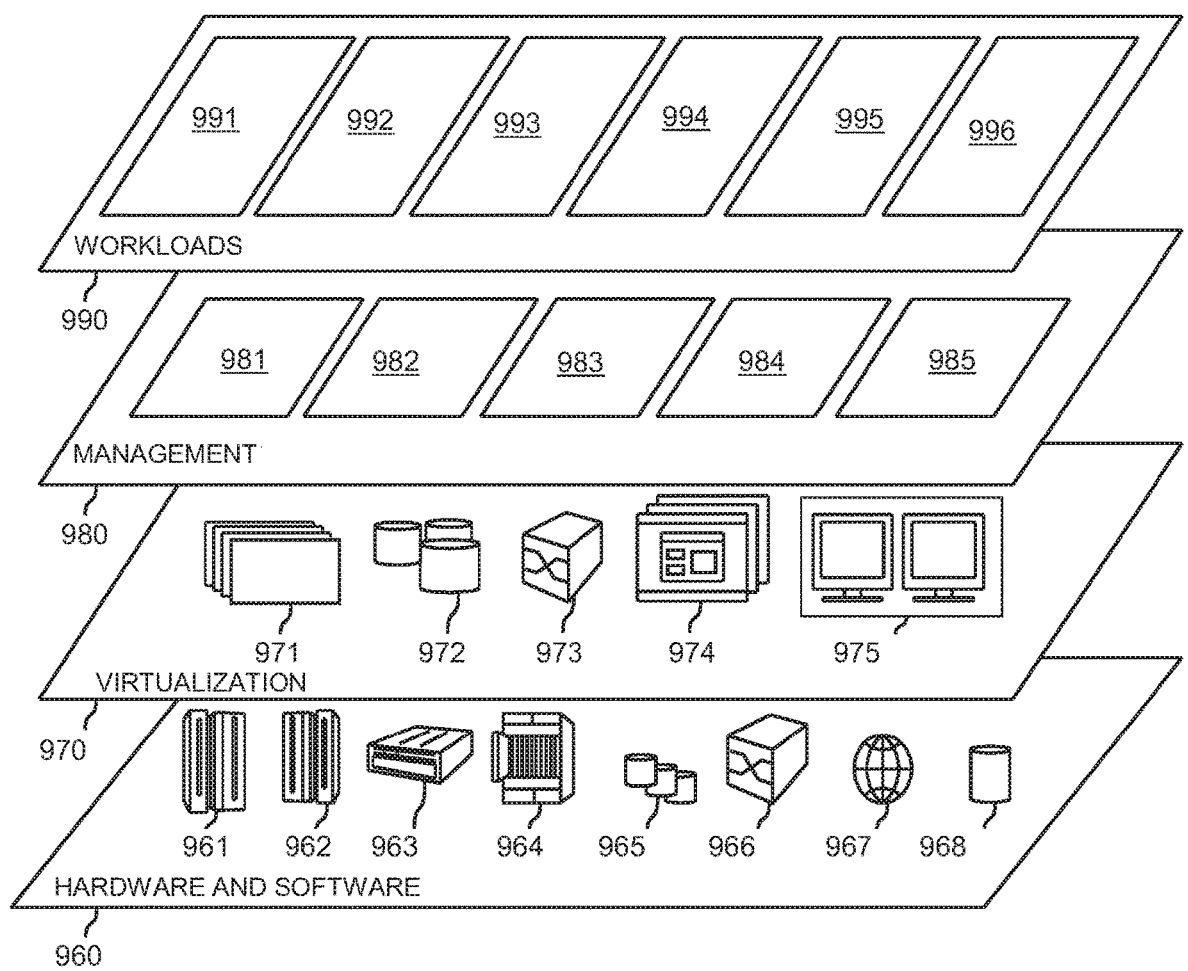
FIG. 9 is a diagram of abstraction model layers of a cloud computing environment in which the present invention may be implemented.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and natural language processing 996.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method, in a data processing system comprising at least one processor and; at least one memory, wherein the at least one memory comprises instructions which are executed by the at least one processor to cause the at least one processor to be specifically configured to implement a natural language processing system for detecting and resolving latent ambiguity in a natural language input, comprising:
   processing, by a scoring component within an annotated semantic graph providing component, a semantic graph data structure to identify each node having latently ambiguous semantic concept by applying a first statistical model that predicts a likelihood that the node is a latently ambiguous semantic concept and a second statistical model that predicts a likelihood that the node is an unambiguous node;
   marking, by the annotated semantic graph providing component, the semantic graph data structure to form an annotated semantic graph data structure based on a knowledge base in which nodes representing semantic concepts are linked by semantic relationships, wherein one or more nodes in the annotated semantic graph data structure are annotated to indicate a latent ambiguity f corresponding semantic concepts;
   processing, by a latent ambiguity processing component executing within the natural language processing system, the natural language input at least by performing activation of the annotated semantic graph data structure;
   applying, by the latent ambiguity processing component, response to encountering an annotated node indicating a latent ambiguity of a corresponding semantic concept during processing of the natural language input, a pre-defined latent ambiguity process to the annotated node to resolve the latent ambiguity associated with the corresponding semantic concept present in the natural language input; and
   outputting, by an output component executing within the natural language processing system, a result of natural language processing of the natural language input based on the resolution of the latent ambiguity associated with the corresponding semantic concept present in the natural language input.

2. The method of claim 1, wherein outputting the result of natural language processing comprises replacing annotated nodes indicating a latent ambiguity of a corresponding semantic concept with an alternative node from the semantic graph data structure.

3. The method of claim 2, wherein outputting the result of natural language processing further comprises, subsequent to replacing annotated nodes, re activating the annotated semantic graph data structure using a latency ambiguity resolution method.

4. The method of claim 2, wherein replacing annotated nodes indicating a latent ambiguity of a corresponding semantic concept with an alternative node from the semantic graph data structure comprises resolving an annotated node to a sub-type node.

5. The method of claim 4, wherein, for each annotated node, a sub-type relationship is followed along an activated path and the annotated node is resolved to a most highly activated sub-type node.

6. The method of claim 4, wherein replacing annotated nodes comprises leveraging learned graph-metric characteristics of annotated nodes in order to rank alternative nodes as appropriate replacements.

7. The method of claim 4, wherein resolving the annotated node to a sub-type node comprises following a same-type path to a configurable level of depth in the annotated semantic graph data structure and resolving the annotated node to a highly activated, low-latency node of the same type.

8. The method of claim 1, wherein a trained statistical model predicts the likelihood that the node is a latently ambiguous semantic concept at least by providing a score of latent ambiguity and including the score in the annotation of the node.

9. The method of claim 1, wherein providing the annotated semantic graph data structure comprises training a statistical model at least by determining a non-leaf node in a semantic graph and a corresponding distance of the non-leaf node to a leaf node, and applying learned lexical and/or graphical characteristics to the non-leaf node, to generate the trained statistical model.

10. The method of claim 1, wherein applying a pre-defined latent ambiguity process to the node includes at least one of ignoring the node in the activation of the annotated semantic graph data structure, boosting a signal for the node during the activation, or penalizing the node during the activation.

11. A computer program product comprising a computer readable storage medium having a computer readable program stored therein, wherein the computer readable program, when executed on a computing device, causes the computing device to be specifically configured to implement a natural language processing system for detecting and resolving latent ambiguity in a natural language input at least by performing the following operations:
   processing, by a scoring component within an annotated semantic graph providing component, a semantic graph data structure to identify each node having a latently ambiguous semantic concept by applying a first statistical model that predicts a likelihood that the n de is a latently ambiguous semantic concept and a second statistical model that predicts a likelihood that the node is an unambiguous node;
   marking, by the annotated semantic graph providing component, the semantic graph data structure to form an annotated semantic graph data structure based on a knowledge base in which nodes representing semantic concepts are linked by semantic relationships in the annotated semantic graph data structure, wherein one or more nodes are annotated to indicate a latent ambiguity of corresponding semantic concepts;
   processing, by latent ambiguity processing component executing within the natural language processing system, the natural language input at least by performing activation of the annotated semantic graph data structure;
   applying, by the latent ambiguity processing component in response to encountering an annotated node indicating a latent ambiguity of a corresponding semantic concept during processing of the natural language input, a pre-defined latent ambiguity process to the annotated node to resolve the latent ambiguity associated with the corresponding semantic concept present in the natural language input; and
   outputting, by an output component executing within the natural language processing system, a result of natural language processing of the natural language input based on the resolution of the latent ambiguity associated with the corresponding semantic concept present in the natural language input.

12. The computer program product of claim 11, wherein outputting the result of natural language processing comprises replacing annotated nodes indicating a latent ambiguity of a corresponding semantic concept with an alternative node from the semantic graph data structure.

13. The computer program product of claim 12, wherein outputting the result of natural language processing further comprises, subsequent to replacing annotated nodes, re-activating the annotated semantic graph data structure using a latency ambiguity resolution method.

14. The computer program product of claim 12, wherein replacing annotated nodes indicating a latent ambiguity of a corresponding semantic concept with an alternative node from the semantic graph data structure comprises resolving an annotated node to a sub-type node.

15. The computer program product as claimed in claim 14, wherein resolving the annotated node to a sub-type node comprises following a sub-type relationship along an activated path and resolving the annotated node to a most highly activated sub-type node.

16. The computer program product as claimed in claim 14, wherein replacing annotated nodes comprises leveraging learned graph-metric characteristics of annotated nodes in order to rank alternative nodes as appropriate replacements.

17. The computer program product as claimed in claim 14, wherein resolving the annotated node to a sub-type node comprises following a same-type path to a configurable level of depth in the annotated semantic graph data structure and resolving the annotated node to a highly activated, low-latency node of the same type.

18. The computer program product of claim 11, wherein a trained statistical model predicts the likelihood that the node is a latently ambiguous semantic concept at least by providing a score of latent ambiguity and including the score in the annotation of the node.

19. The computer program product of claim 11, wherein providing the annotated semantic graph data structure, comprises training a statistical model at least by determining a non-leaf node in a semantic graph and a corresponding distance of the non-leaf node to a leaf node, and applying learned lexical and/or graphical characteristics to the non-leaf node, to generate the trained statistical model.

20. The computer program product of claim 11, wherein applying a pre-defined latent ambiguity process to the node includes at least one of ignoring the node in the activation of the annotated semantic graph data structure, boosting a signal for the node during the activation, or penalizing the node during the activation.

21. An apparatus comprising:
at least one processor; and
at least one memory coupled to the at least one processor, wherein the at least one memory comprises instructions which, when executed by the at least one processor, cause the at least one processor to be specifically configured to implement a natural language processing system for detecting and resolving latent ambiguity in a natural language input at least by performing the following operations:

processing, by a scoring component within an annotated semantic graph providing component, a semantic graph data structure to identify each node having a latently ambiguous semantic concept by applying a first statistical model that predicts a likelihood that the node is a latently ambiguous semantic concept and a second statistical model that predicts a likelihood that the node is an unambiguous node;

marking, by the annotated semantic graph providing component, the semantic graph data structure to an annotated semantic graph data structure based on a knowledge base in which nodes representing semantic concepts are linked by semantic relationships in the annotated semantic graph data structure, wherein one or more nodes are annotated to indicate a latent ambiguity of corresponding semantic concepts;

processing, by a latent ambiguity processing component executing within the natural language processing system, the natural language input at least by performing activation of the annotated semantic graph data structure;

applying, by the latent ambiguity processing component, in response to encountering an annotated node indicating a latent ambiguity of a corresponding semantic concept during processing of the natural language input, a pre-defined latent ambiguity process to the annotated node to resolve the latent ambiguity associated with the corresponding semantic concept present in the natural language input; and outputting, by an output component executing within the natural language processing system, a result of natural language processing of the natural language input based on the resolution of the latent ambiguity associated with the corresponding semantic concept present in the natural language input.

22. The apparatus of claim 21, wherein outputting the result of natural language processing comprises replacing annotated nodes indicating a latent ambiguity of a corresponding semantic concept with an alternative node from the semantic graph data structure.

23. The apparatus of claim 22, wherein outputting the result of natural language processing further comprises, subsequent to replacing annotated nodes, re-activating the annotated semantic graph data structure using a latency ambiguity resolution method.

24. The apparatus of claim 21, wherein a trained statistical model predicts the likelihood that the node is a latently ambiguous semantic concept at least by providing a score of latent ambiguity and including the score in the annotation of the node.

25. The apparatus of claim 21, wherein providing the annotated semantic graph data structure comprises training a statistical model at least by determining a non-leaf node in a semantic graph and a corresponding distance of the non-leaf node to a leaf node, and applying learned lexical and/or graphical characteristics to the non-leaf node, to generate the trained statistical model.

* * * * *